Feb. 23, 1954  W. T. HARRIS ET AL  2,669,832
WIND AND SET MECHANISM FOR WATCHES
Filed June 24, 1949  2 Sheets-Sheet 1
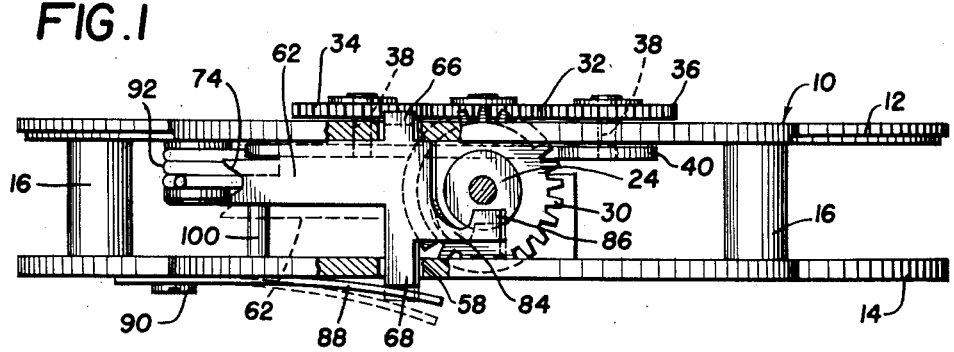
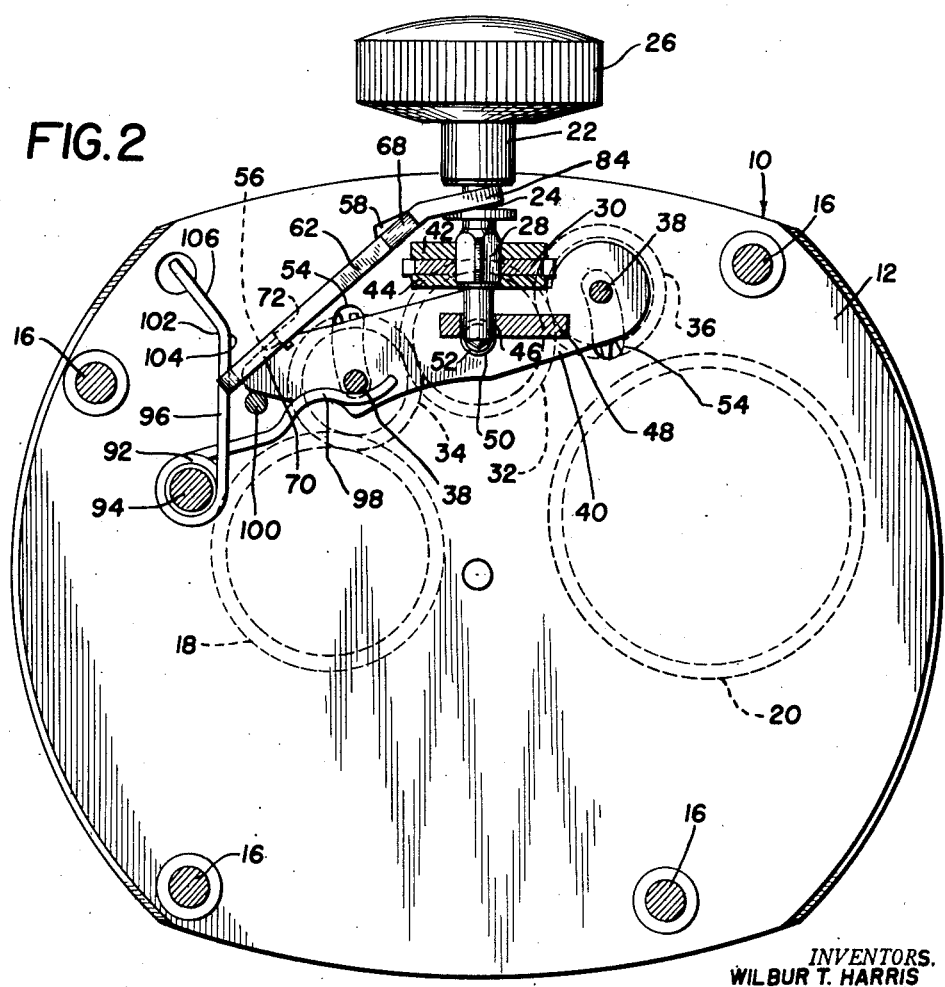
INVENTORS.
WILBUR T. HARRIS
WILLIAM B. PEGRAM
HENRY S. BRAZEE
LOUIS A. HUMMEL
BY
ATTORNEY.

Feb. 23, 1954 W. T. HARRIS ET AL 2,669,832
WIND AND SET MECHANISM FOR WATCHES
Filed June 24, 1949 2 Sheets-Sheet 2
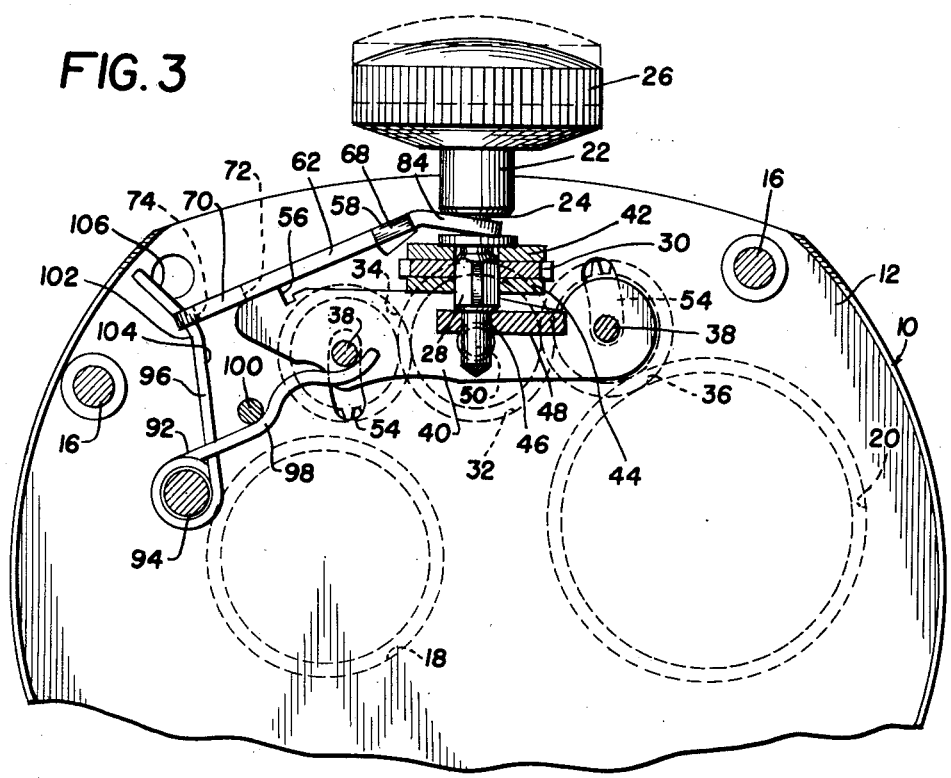
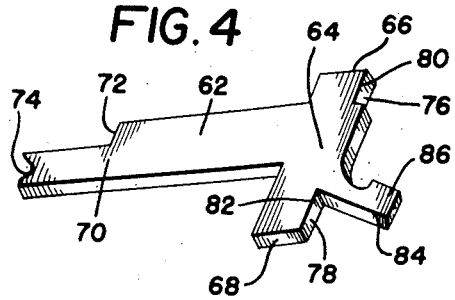
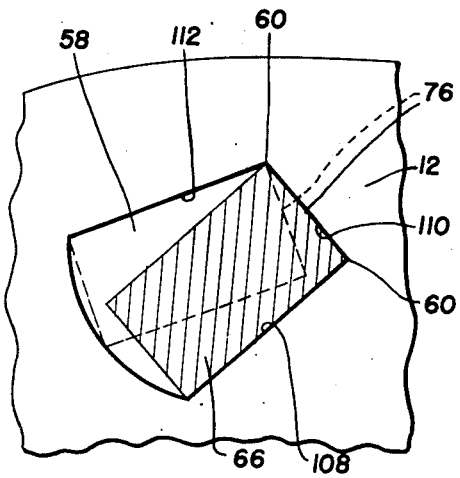
INVENTORS.
WILBUR T. HARRIS
WILLIAM B. PEGRAM
HENRY S. BRAZEE
LOUIS A. HUMMEL
BY F. J. Pisarra
ATTORNEY.

Patented Feb. 23, 1954

2,669,832

UNITED STATES PATENT OFFICE 2,669,832

WIND AND SET MECHANISM FOR WATCHES

Wilbur T. Harris, Southbury, Conn., William B. Pegram, Swarthmore, Pa., Henry S. Brazee, Terryville, and Louis A. Hummel, Waterbury, Conn., assignors to The United States Time Corporation, Middlebury, Conn., a corporation of Connecticut Application June 24, 1949, Serial No. 101,176

14 Claims. (Cl. 58—71)

This invention relates to improvements in devices commonly referred to as wind and set mechanisms in watches. More particularly, the invention relates to improvements in the rocking bar, set lever, pivotal means for supporting the same, and a spring mechanism for biasing said bar and lever.

Since winding and setting a watch is done quite frequently, any forces within the watch which tend to render difficult the operation of the winding and setting crown and the mechanism actuated thereby will result in such difficulty being promptly and readily implanted in the mind of the user. As a result, the ease or difficulty with which such winding and setting mechanism is actuated is considered by many users a major factor in judging the quality of a watch.

In expensive watches, it is possible to finish all components of the wind and set mechanism to very close tolerances whereby the actuation thereof is rendered very easy and the so-called "feel" of the actuation of such mechanism favorably impresses the user.

Inexpensive watches, however, must be formed from components which are produced by methods which will result in cheap production costs and, in general, many of the components of the wind and set mechanism of an inexpensive watch are produced by punch press, milling and screw machine operations, and bending operations, and only as few finishing operations as are absolutely necessary are performed on the components. Using such cheaply produced components has generally resulted in a so-called hard-acting wind and set mechanism in inexpensive watches.

In addition to the lack of superior finish and close tolerances referred to above, the components of inexpensive watches have heretofore in general been relatively large in order that tool maintenance would be at a minimum.

The wind and set mechanism in inexpensive watches has therefore usually heretofore been composed of relatively large and somewhat bulky parts, and this has been particularly true of the rocking bar and set lever of the wind and set mechanism.

It is the principal object of the present invention to produce a wind and set mechanism which will lend itself to the production of a smaller overall size of watch movement as well as a movement which will be operable in such a manner that the components of the mechanism used for winding and setting will have an easy "feel" during their operation without unduly increasing the cost of their production over their cost by currently used production methods. This object is attained in general by the provision of the following structural characteristics within the wind and set mechanism of a watch.

I. The rocking bar and set lever are formed solely by stamping or punch press operations from sheet stock and the surfaces of critical dimension are entirely formed during such stamping operations, as distinguished from bending operations, thus inexpensively affording control of tolerances within close limits.

II. The set lever is pivoted directly to the frame plates by utilizing integral trunnions on the set lever having knife edges engaging suitable fulcrum bearing apertures punched or stamped directly in the frame plates. The rocking bar engaging portion and the trunnions are all in the same plane and are formed by a simple stamping operation by which the critical dimension therebetween is cheaply and effectively maintained within close tolerances.

III. The set lever and rocking bar are so mounted that the smooth stock production surface of the set lever co-acts with the raw or stamped edge of one end of the rocking bar to produce a smooth sliding engagement without any substantial or expensive finishing operations of these components being required.

IV. A single spring, formed preferably from wire stock, is provided with a bearing loop intermediate its ends to position the spring on a suitable pivot fixed to one of the frame plates, and the ends of the spring are relatively long and so shaped that one end is arranged to engage an end of the set lever so as to cam the set lever into engagement with the rocking bar when the rocking bar is moved to setting position, and also cam the set lever away from engagement with the rocking bar when the latter is moved toward winding position. The other end of said spring engages the rocking bar and normally biases it toward winding position. Cooperating with said end of the spring is an abutment fixed to the back frame plate in order to limit said biasing of the rocking bar so that engagement of the wind or ratchet pinion on the rocking bar will not be too deep with the teeth of the winding gear.

Details of the foregoing structures and characteristics as well as details of the invention and other objects thereof are set forth in the following specification and illustrated in the accompanying drawings comprising a part thereof.

In the drawings:

Fig. 1 is a top edge view of a watch movement embodying the principles of the invention, certain parts being shown in cross section and other parts omitted for better illustration.

Fig. 2 is a plan view of the watch movement shown in Fig. 1 as viewed looking toward the back frame plate but with the back frame plate removed to expose details of the invention. In this view, the components are disposed in setting position.

Fig. 3 is a fragmentary view similar to Fig. 2 but showing the components disposed in winding position.

Fig. 4 is a perspective view of the set lever per se of the invention.

Fig. 5 is an enlarged fragmentary plan view of one trunnion of the set lever mounted within a segmental bearing opening of one frame plate, the trunnion being shown in full lines in one position and in dotted lines in another position.

In the drawings, a wrist watch movement has been illustrated for purposes of explaining the principles of the invention, but it is to be understood that said principles may be applied with equal facility to any type of watch mechanism or movement.

Referring to the drawings, the movement 10 comprises a front frame plate 12 and a back frame plate 14 which are maintained in spaced relationship by suitable pillars 16, said frame plates and pillars comprising what is commonly known as a frame. In order that the details of the invention may be more clearly understood, most of the conventional components of a watch movement have been omitted from the frame herein illustrated, particularly since the present invention is mainly concerned with the winding and setting mechanism of a watch movement. For purposes of the present description, it is to be presupposed that the watch movement has a dial train which has a pinion that meshes with the diagrammatically illustrated setting gear 18 shown in dotted lines in Figs. 2 and 3. Actually, said setting gear is the minute wheel of the dial train. It is also presupposed that there is a time train and a barrel containing a mainspring which energizes a barrel gear that drives said time train of the movement. The mainspring is wound by winding gear 20 diagrammatically illustrated by dotted lines in Figs. 2 and 3, said winding gear being connected to the barrel arbor.

A winding stem 22, having an annular groove 24 and a winding crown 26, is slidably and rotatably mounted as follows. The stem 22 is provided with a squared section 28 which is slidably received within a complementary opening in crown gear 30, whereby said crown gear may be rotated when the winding stem is rotated in any selected longitudinal position thereof. Crown gear 30 meshes with intermediate pinion 32 which is diagrammatically illustrated by a dotted line and is rotatable about a pivot fixed relative to the frame and meshes with set pinion 34 and wind or ratchet pinion 36 shown in Fig. 1 in full lines and in dotted lines in Figs. 2 and 3. Set pinion 34 and ratchet pinion 36 are rotatably mounted on suitable headed pins 38 which are both fixed to rocking bar 40.

Crown gear 30 is preferably flat and is rotatable between a pair of fixed parallel plates 42 and 44 which have extensions, not shown, fitting into suitable apertures formed in frame plates 12 and 14 for purposes of securely positioning the plates 42 and 44 in spaced relationship. Said plates have centrally thereof aligned cylindrical openings of suitable diameter to serve as bearings to slidably and rotatably receive the squared section 28 of winding stem. Said openings also cooperate with a bearing opening 46 formed in a bridge member 48 which is secured to and between the frame plates in a manner similar to plates 42 and 44. Opening 46 is axially aligned with the central openings of plates 42 and 44 and rotatably and slidably receives the inner end of winding stem 22. When the components of the winding and setting mechanism are in winding position as indicated in Fig. 3, the lower end of the squared section 28 of stem 22 abuts the upper surface of bridge member 48, as shown in Fig. 3, and prevents further inward movement of the winding stem and crown. Outward movement of the winding stem is limited by means to be described hereinafter. It will thus be seen that the winding stem is not only mounted for rotation but is also longitudinally movable between two extreme positions comprising the winding and setting positions of the stem and crown.

It will be noted that rocking bar 40 is pivotally mounted parallel to and adjacent the inner surface of front frame plate 12. The rocking bar is provided with a bearing aperture 50 which receives a short shaft or stud 52 fixed to front frame plate 12. Thus, the rocking bar is disposed between the two frame plates, and front frame plate 12 is provided with a plurality of arcuate slots 54 which accommodate the pintles or headed pins 38 that are fixed to the rocking bar and pivotally support the set and ratchet pinions 34 and 36. Disposing rocking bar 40 between the frame plates results in fewer components in a so-called outboard position on the outer surfaces of the frame plates of the movement and the overall thickness of the movement is consequently reduced notwithstanding the fact that the set and ratchet pinions are positioned on the exterior of the frame.

Rocking bar 40 is formed from smooth surfaced, flat sheet-like stock by stamping or punching operations performed by a suitable press. All of the necessary apertures are preferably formed in the rocking bar by punching operations and one end of the rocking bar is also provided with a suitable locking notch 56 formed incident to said operations. Thus, the rocking bar may be entirely formed by a punching process with only a minimum of finishing operations being required. It is well recognized that tolerances may be held quite inexpensively within close dimensions where punching operations only are involved to establish such dimensions, and it will be observed that critical distances such as that between the central bearing aperture 50 and the locking notch 56 of a rocking bar may be inexpensively maintained in mass production of such rocking bars as a result of being formed by said stamping operations, regardless of whether the aperture and notch are formed by a single or progressive dies.

Frame plates 12 and 14 are also provided with transversely aligned, segmental fulcrum bearing apertures 58, one corner or notch 60 of each comprising that portion of the aperture which is rockably or pivotally engaged by the knife edge of a trunnion to be described. It will be observed that the corner or notch 60 is disposed quite closely to the edge of the frame plate for advantages to be described, and said bearing apertures are formed solely by punching operations whereby the shape and position thereof relative to other portions of the frame plates may be readily and inexpensively maintained within very close tolerances.

Elongated set lever 62 is likewise formed from smooth surfaced, flat sheet-like stock material. Said set lever is illustrated to advantage perspectively in Fig. 4. In plan view, the set lever is somewhat cross-shaped with the cross bar 64 being disposed closer to one end than the other of the set lever. The opposite ends of the cross bar comprise trunnions 66 and 68 which are aligned transversely relative to the major axis of the elongated set lever. End portion 70 of the set lever, in plan view, has a stepped effect, one step thereof comprising a locking surface 72 and the outermost step is provided with a notch or recess 74 to slidably engage a biasing spring to be described.

The locking surface 72 and the surfaces 76 and 78 of the trunnions, as well as the other edge surfaces of the trunnions are formed by the same stamping operation by which the set lever is produced from flat stock. The surfaces 76 and 78 of the trunnions 66 and 68 meet the upper flat surface of the cross bar 64 which forms the trunnions to provide knife edges 80 and 82 which engage the corners or notches 60 of the fulcrum bearing apertures 58 and rock therein between the full line positions and the dotted line positions of the trunnions illustrated in Fig. 5. Locking surface 72 of the set lever co-acts with locking notch 56 of the rocking bar to maintain the rocking bar in set position illustrated in Fig. 2. It will be noted that locking surface 72 is approximately perpendicular to the plane of set lever 62, and there is substantially no undercut provided since none is required for reasons to be hereinafter set forth. The distance is critical between locking surface 72 and the surfaces 76 and 78 of the trunnions which provide one wall of the knife edges 80 and 82, but since said surfaces are formed by stamping, such critical distance may be inexpensively maintained within very close tolerances.

The use of segment-like bearing apertures 58 as well as placing them near the edge of the frame plates with their corners or notches 60 as close as possible to the outer edges of the frame plates positions the effective pivot point of the set lever trunnions much nearer the edge of the frame plate than would be possible if cylindrical apertures or supporting staffs or screws were used to pivotally support the set lever. The important result of using the apertures 58 and knife edged trunnions is that the set lever and rocking bar may be positioned nearer to the edge of the frame plates than in conventional watch movements and affords appreciable additional space below the set lever and rocking bar, as seen in Figs. 2 and 3, into which other components can be disposed to decrease the overall size of the watch movement.

In conventional constructions where cylindrical pins or screws are used as pintles or pivots for a set lever, for example, the pin or screw must necessarily be spaced inward from the edge of the frame plates a substantial distance to provide enough frame plate stock or material around the pin or screw to support it. The effective pivot point or center of rotation of the screw or pin is thus spaced even further inward from the edge of the frame plate an amount at least equal to the radius of the pin or screw. Further, when a screw is used as the pivotal support or pintle for a set lever or rocking bar, a loose or sloppy fit results between the set lever bearing aperture and the threads of the screw, whereby close tolerances cannot be maintained relative to the critical dimension, for example, between the effective center of rotation of the set lever and the locking surface thereon which engages the rocking bar notch.

Set lever 62 is also provided with an integral extension 84 having the same thickness as the other portions of the lever and the configuration of said extension is such as to provide a lug 86 which is normally engageable with the annular groove 24 of the winding stem whereby longitudinal movement of the latter in opposite directions moves the set lever either toward its winding position shown in Fig. 3 or its set position shown in Fig. 2, said set lever being pivoted on its knife edges within the bearing apertures 58. When the set lever is in its setting position, engagement of the lug 86 with the groove 24 of the winding stem will limit outward movement of the stem. As is readily seen in Figs. 2 and 3, extension 84 is disposed at an angle of substantially 30° to the plane of the main flat portion of the set lever; but it will be observed that the angular bend is positioned past the end surfaces 76 and 78 of the trunnions, whereby such bending as is required to position the extension 84 will not interfere with the critical distance between the locking surface 72 and the end surfaces 76 and 78 of the trunnions. This is one of the important features of the present invention.

Bending the extension 84 relative to the main portion of the set lever also permits equalizing the angle the set lever lug 86 traverses in moving between the winding and setting positions thereof. Placing the effective pivot center of the trunnions of the set lever as near the edge of the frame plates as possible permits the use of a smaller angle between the extension and the main portion of the set lever and more closely approximates a straight lever with the consequent higher mechanical efficiency and advantages of such straight lever when serving as a fulcrum lever. Equalizing the angle which the set lever traverses in moving between the winding and setting positions thereof permits the use of a narrower groove 24 in the winding stem than if the angle were not equalized and results in minimizing the play between the walls of said groove and the top and bottom surfaces of lug 86 when the winding stem moves the set lever to either its winding or setting positions.

It will also be observed that the set lever 62 is disposed between the frame plates 12 and 14 and the ends of the trunnions, as shown in Fig. 1, are substantially flush with the outer surfaces of the frame plates. If desired, said ends of the trunnions may extend slightly beyond the outer surfaces of the frame plates in order to facilitate ready and inexpensive maintenance of manufacturing tolerances. When the lug 86 is disposed within the annular groove 24 of the winding stem, there is a space provided between extension 84 and frame plate 14, whereby set lever 62 may be moved transversely in a direction longitudinal to its trunnions, toward frame plate 14 to the dotted line position thereof shown in Fig. 1, in order to disengage lug 86 from groove 24 and permit the removal of the winding stem and crown from the movement without requiring the removal of screws or any other components as is now customary in many types of conventional watch movements. During such movement of the trunnions, they slide within the bearing apertures

58. Such removal of the stem and crown may also be accomplished without removing the dial from the movement. The depth with which the lug 86 engages the groove 24 is less than the length of trunnion 66 disposed in its bearing aperture 58, whereby when the set lever is moved laterally to effect disengagement of the lug 86 with the groove 24, the trunnions will both preferably still be disposed in their bearing apertures to provide firm support for the set lever during such sliding motion thereof.

Secured to the exterior of frame plate 14 is a flat leaf spring 88 which may be attached by any suitable means such as a screw 90, the free end of said spring engaging the outer end of trunnion 68 of the set lever, whereby the spring normally biases the set lever and lug 86 in a direction to disposed the lug within the groove 24. The above-described lateral movement of the set lever 62 for effecting removal of the winding stem and crown is in opposition to the force of spring 88, but inasmuch as said spring need not be very strong, such movement of the set lever may be effected simply by the use of tweezers or any other suitable tool by which the set lever may be engaged to cause the desired movement. In lieu of the spring 88, any other suitable means may be used to disengageably maintain the lug 86 within the groove 24 such as, for example, a readily removable blocking or wedging member which may be disposed partially around trunnion 68, between extension 84 and frame plate 14.

The mounting of the set lever and rocking bar between the frame plates is such that said lever and bar are disposed with their principal planes substantially at a right angle to each other. This arrangement is advantageous in that the smooth finished stock surface of the material from which the set lever is formed slidably engages the cut or raw stamped surface of the notched end of the set lever during substantially the entire co-engaged movement of the set lever and rocking bar between the setting and winding positions thereof. Only when the cut or stamped locking surface 72 of the set lever engages the similarly formed surface of notch 56 does a raw, cut surface engage another raw, cut surface on said components. It will thus be seen that a minimum of friction occurs between the set lever and rocking bar during the major portion of their movement relative to each other due principally to the utilization of the smooth finished stock surface of the set lever as one of the co-engaged surfaces.

An elongated spring preferably formed from wire or other similar stock is bent intermediate its ends to provide a bearing portion 92 which surrounds a headed pintle 94 fixed to the inner surface of frame plate 12. The elongated ends 96 and 98 of the spring provide spaced sections respectively engaging one end of set lever 62 and one of the pintles or pins 38 fixed to rocking bar 40, whereby in effect the latter end or section of the spring engages the rocking bar. The bearing portion 92 of the spring permits rotation of the ends of the spring as a unit relative to pintle 94 and the frame of the movment. End 98 of the spring normally moves in a direction to bias the rocking bar toward winding position wherein the ratchet pinion 36 engages the teeth of winding gear 20. Such biasing of the rocking bar is limited by engagement of the end 98 of the spring with an abutment 100 comprising a pin fixed to the inner surface of frame plate 12. This limiting of the biasing of the rocking bar will prevent too deep or overengagement between the teeth of the ratchet pinion 36 and the winding gear 20 and will result in an easier action during the winding of the mainspring by rotation of the crown 26.

The end 96 of the spring is provided with a bend 102 which forms a crest from which camming surfaces 104 and 106 extend at an angle to each other in opposite directions. Said camming surfaces slidably engage the notch 74 in the end of set lever 62. Due to the engagement of end 98 of the spring with pin 38, the end 96 of the spring is placed under tension directed inward toward set lever 62, and in view of the engagement of the camming portion 104 or 106 with the end of said set lever, end 98 of the spring will be placed under tension directed toward pin 38; whereby the two ends 96 and 98 of the spring supplement each other in exerting force upon the rocking bar and the set lever. It is thus possible to use a lighter or less strong spring in this construction than in conventional constructions where a single spring is used to engage either the set lever or the rocking bar.

Camming surface 106, when in engagement with the notch 74 of the set lever, biases the set lever in a direction to permit the rocking bar to move clockwise toward its winding position shown in Fig. 3; whereas when camming surface 104 is in engagement with notch 74, said surface will bias the set lever in a direction to move the rocking bar toward its setting position shown in Fig. 2. After locking surface 72 of the set lever engages locking notch 56 of the rocking bar, camming surface 104 will press against the end of the set lever to maintain said locking surfaces in co-engagement and no undercutting of either surface will be required to securely maintain the set pinion 34 in engagement with setting gear 18 during setting operations. Such lack of undercutting will result in an easier disengagement of the rocking bar and set lever when moving the rocking bar from setting to winding positions. If desired, however, undercutting of the locking surfaces may be utilized but a slightly harder disengaging action will result.

To summarize the function of the unitary spring comprising ends 96 and 98, as viewed in Fig. 3, the spring is rotated clockwise about pintle 94 when the rocking bar is moved by the set lever from its winding to setting positions. Such movement of the spring is caused by the rocking bar moving end 98 of the spring clockwise and simultaneously placing end 96 under greater tension against the end of set lever 62 at a time when such extra tension is most needed to assist moving the set lever in a direction to cause locking surface 72 thereof to move into engagement with the locking notch 56 of the rocking bar. This added tensioning becomes beneficial after the end of the set lever has moved over the crest between camming surfaces 104 and 106 and surface 104 is in camming engagement with the notch 74 of the set lever. The converse is true relative to the motion of the rocking bar when the latter is being moved from winding to setting positions by a biasing action of end 98 of the spring and, under these circumstances, the spring will be moved as a unit generally in counterclockwise direction. By using such a spring arrangement, a weaker spring may be used than would normally be required if a single rocking bar spring were used to perform the double function of holding the locked engagement between the rocking bar and set lever when in setting position as well as move the rocking bar from setting to winding positions.

Heretofore, it has been necessary to use a relatively strong spring to accomplish both of these functions and, in inexpensive watch movements particularly, such a strong spring produced a hard action in moving the rocking bar and set lever between their winding and setting positions. By using a spring made in accordance with the present invention, a spring may be selected that is only strong enough to either maintain the set lever and rocking bar in locked engagement or bias the rocking bar from setting to winding positions since the force produced by the end 98 of the spring is supplemented by the camming force produced by surface 106 of end 96 of the spring to assist in moving the rocking bar from its setting to winding positions.

It is also evident from the drawings and the foregoing description that the end 96 of the spring and particularly the camming surface 106 thereof biases the knife edges 80 and 82 of the trunnions into the corners 60 of the fulcrum bearing apertures 58 when the set lever is being moved clockwise, as viewed in Figs. 2 and 3, from setting to winding positions; and the pull of the winding stem 22 will maintain said knife edges within said corners 60 when the set lever is being moved counterclockwise, as viewed in said figures, from winding to setting positions. At substantially all times, therefore, the knife edges 80 and 82 will be disposed within and rock relative to the corners 60 of the segmental fulcrum bearing apertures 58.

In Fig. 5, an enlarged fragmentary portion of the frame plate 12 is shown to more clearly illustrate the functioning of the trunnions and bearing apertures. When the trunnions 66 are disposed in the setting position of the set lever as shown in full lines in said figure, the broad, flat undersurface of each trunnion is disposed flatly against the long flat lower surface 108 of the aperture 58, and the surface 76 of the trunnion will be flatly disposed against the surface 110 of aperture 58. Thus, the co-engaging surfaces of the trunnions and the bearing apertures 58 are substantial and firm when the set lever is locked with the rocking bar in setting position and wear between the co-engaging surfaces of the trunnions and bearing apertures will thus be reduced to a minimum. When the set lever 62 is disposed in winding position as shown in Fig. 3, the trunnions will be disposed in the dotted line position shown in Fig. 5 and the upper broad surface of the trunnions will be disposed flatly against the upper surface 112 of the bearing aperture to provide substantial engagement therebetween when the rocking bar and cam surface 106 of the spring are maintaining the set lever in winding position.

While the invention has been illustrated and described in its preferred embodiment and has included certain details, it should be understood that the invention is not to be limited to the precise details herein illustrated and described since the same may be carried out in other ways, falling within the scope of the invention as claimed.

What we claim is:

1. In a watch movement, the combination of a pair of spaced frame plates having bearing apertures formed therein each of said apertures having angularly disposed intersecting wall portions forming a notch, and a set lever having trunnions integral therewith, said trunnions each being provided with a knife edge which pivotally engages the notch in one of said bearing apertures.

2. In a watch movement, the combination of a pair of spaced frame plates having segment-like bearing apertures formed therein and aligned in a direction transverse to the plane of said plates, and a set lever having trunnions fixed relative to said set lever and each provided with a knife edge which pivotally engages a corner of one of said segment-like bearing apertures.

3. In a watch movement, the combination of a frame, a rocking bar pivotally supported thereby, a ratchet pinion rotatably supported by said rocking bar, a winding gear rotatable relative to said frame, a spring engageable with said rocking bar to normally bias it in a direction to move the ratchet pinion thereon into engagement with said winding gear, and an abutment fixed relative to said frame and engageable by said spring to prevent further biasing movement of the rocking bar thereby prior to the teeth of said pinion and gear becoming engaged to their full depth.

4. In a watch movement, the combination of a frame, a rocking bar and a set lever pivotally supported thereby and having co-engaging releasable locking means, said rocking bar being movable between conventional setting and winding positions and said set lever having a notch in one end thereof, and a longitudinally extending spring engageable with the notch in said set lever and having a bend intermediate its ends to provide a crest and angularly related camming portions sloping away from said crest in opposite directions, one of said portions normally biasing said set lever in a direction to engage said rocking bar to move it into its setting position wherein engagement of said locking means is effected and also releasably maintaining said means in engagement, and the other of said portions when the set lever is moved into engagement with it biasing the set lever away from engagement with said rocking bar to facilitate the movement of said rocking bar toward its winding position.

5. In a watch movement, the combination of a frame, a rocking bar pivotally supported thereby for movement between setting and winding positions, a set lever pivotally supported by said frame for movement in opposite directions, and a spring having spaced sections movable relative to said frame, one of said sections being engageable with said set lever and having camming portions respectively engageable with said set lever to bias it in a direction to engage and move said rocking bar into its setting position and bias the set lever in the opposite direction away from engagement with said rocking bar, the other section of said spring engaging said rocking bar to bias it toward its setting position, said sections of said spring co-acting to supplement each other.

6. In a watch movement, the combination of a frame, a rocking bar pivotally supported thereby for movement between setting and winding positions, a set lever pivotally supported by said frame for movement in opposite directions, said set lever when moved in one direction being engageable with said rocking bar to move it toward its setting position, a pintle fixed relative to said frame, an elongated spring bent to provide a bearing portion intermediate its ends engaging said pintle, one end of said spring engaging said set lever to bias it in said one direction to engage said rocking bar and the other end of said spring engaging said rocking bar to normally bias it toward its winding position, whereby said spring is pivotally movable as a unit around said pintle and one end of said spring serves as means to tension the other end and vice versa.

7. In a watch movement, the combination of a frame, a rocking bar pivotally supported thereby for movement between setting and winding positions, a set lever pivotally supported by said frame for movement in opposite directions, and a spring having an intermediate portion fixedly positioned relative to said frame, said spring having relatively long ends one of which has camming portions respectively engageable with said set lever to bias it in a direction to engage and move said rocking bar into its setting position and bias the set lever in the opposite direction away from engagement with said rocking bar, the other end of said spring engaging said rocking bar to bias it toward its setting position, said ends of said spring co-acting to supplement each other and the length thereof rendering easy the movements of said set lever and rocking bar.

8. In a watch movement, the combination of a frame, a rocking bar pivotally supported thereby for movement between setting and winding positions, a ratchet pinion rotatably supported by said rocking bar, a winding gear rotatable relative to said frame and a set lever pivotally supported by said frame for movement in opposite directions, a spring having an intermediate portion fixedly positioned relative to said frame, said spring having ends one of which has camming portions respectively engageable with said set lever to bias it in a direction to engage and move said rocking bar into its setting position and bias the set lever in the opposite direction away from engagement with said rocking bar, the other end of said spring engaging said rocking bar to bias it toward its winding position wherein said ratchet pinion is engaged with said winding gear, said ends of said spring co-acting to supplement each other, and an abutment fixed relative to said frame and engageable by said other ends of said spring to prevent further biasing movement of the rocking bar thereby prior to the teeth of said pinion and gear becoming engaged to their full depth.

9. A watch movement comprising in combination, a pair of spaced frame plates having bearing apertures therein, a flat sheet-like set lever having trunnions integral therewith extending from opposite sides and pivotally mounted within said bearing apertures, said set lever also having an integral extension bent at an angle thereto, a winding stem supported for rotatable and slidable movement relative to said plates and having an annular groove therein, a lug projecting from said bent extension of said set lever and normally positioned within said annular groove, whereby upon longitudinal movement of said stem said set lever will be pivotally moved thereby, said lug and extension being positioned between said stem and one of said frame plates and spaced from said frame plate when said lug is disposed in said groove, and means normally biasing the set lever and lug into engagement with said groove but said set lever being movable against the force of said biasing means toward said last mentioned frame plate to permit said lug to disengage said groove and release said winding stem for removal from the watch movement.

10. A watch movement comprising in combination, a pair of spaced frame plates having bearing apertures therein, a set lever having integral trunnions pivotally mounted within said bearing apertures and also a locking surface on one end portion and a lug on an opposite end portion, said set lever being flat except that said opposite end portion and lug are in a plane at an angle to said lever but said angle being past the trunnions of said set lever, whereby the critical surfaces of said locking surface and trunnions are on the flat portion of the set lever and unaffected by disposing said opposite end portion at an angle thereto, a winding stem supported for rotatable and slidable movement relative to said plates and having an annular groove therein, said lug on said opposite end portion of said set lever projecting therefrom so as to be positioned normally within said annular groove, whereby upon longitudinal movement of said stem said set lever will be pivotally moved thereby, said lug being positioned between said stem and one of said frame plates and spaced from said frame plate when said lug is disposed in said groove, and means normally biasing the lug of said set lever into engagement with said groove but said set lever being movable against the force of said biasing means toward said last mentioned frame plate to permit said lug to disengage said groove and release said winding stem for removal from the watch movement.

11. A set lever comprising a substantially flat member having oppositely directed trunnions fixed to and projecting from the sides of said member, one end portion of said member having a locking surface and said locking surface and one surface of each of said trunnions being substantially vertical to the plane of said member, and an opposite end portion disposed in a plane at an angle to said flat member and integral therewith, said opposite end portion having a lug projecting therefrom in the plane of said opposite end portion.

12. A set lever comprising a substantially flat member having oppositely directed trunnions fixed to and projecting from the sides of said member, one end portion of said member having a locking surface and a recess arranged to receive a biasing means, said locking surface and one surface of each of said trunnions being substantially vertical to the plane of said member, and an opposite end portion disposed in a plane at an angle to and integral with said flat member, said opposite end portion having a lug projecting therefrom in the plane of said opposite end portion.

13. A set lever comprising a substantially flat member having oppositely directed trunnions integral therewith and projecting from the sides of said member, one end portion of said member having a stepped configuration of which one surface comprises a locking surface and said locking surface and one surface of each of said trunnions being substantially vertical to the plane of said member, another surface of said stepped configuration having a recess arranged to receive a biasing means, and an extension integral with said flat member and disposed past said trunnions in a plane at an angle to said flat member, said extension having a lug projecting therefrom in the plane of said extension.

14. In a watch movement, the combination of a pair of spaced frame plates having therein fulcrum bearing apertures aligned in a direction transverse to the plane of said plates and each having angularly disposed intersecting wall portions forming a notch, a set lever having trunnions provided with knife edges engaging the notches in said fulcrum bearing apertures for rocking movement in opposite directions, a winding stem engaging said set lever and movable lengthwise to pivotally move said set lever, and a spring engaging said set lever in a manner to bias said knife edges of said trunnions into engagement with said notches whereby said knife edges of said trunnions are always disposed within said notches for rocking movement therein.

WILBUR T. HARRIS.
WILLIAM B. PEGRAM.
HENRY S. BRAZEE.
LOUIS A. HUMMEL.

References Cited in the file of this patent

UNITED STATES PATENTS

| Number | Name | Date |
| --- | --- | --- |
| 204,606 | Powell | June 4, 1878 |
| 445,182 | Johnson | Jan. 27, 1891 |
| 448,877 | Chopard | Mar. 24, 1891 |
| 672,728 | Bannatyne | Apr. 23, 1901 |
| 708,985 | Bassoff | Sept. 16, 1902 |
| 968,436 | Wehinger | Aug. 23, 1910 |
| 1,537,390 | Vincent | May 12, 1925 |
| 2,362,245 | Cohen | Nov. 7, 1944 |

FOREIGN PATENTS

| Number | Country | Date |
| --- | --- | --- |
| 757,267 | France | Oct. 9, 1933 |